Patented June 9, 1953

2,641,618

UNITED STATES PATENT OFFICE 2,641,618

HYDROGENATION OF 1,1-DIPHENYL-2,2-DIMETHYL-PROPANOL-1

Edward F. Rogers, Middletown, and Horace D. Brown, Plainfield, N. J., assignors to Merck & Co., Inc., Rahway, N. J., a corporation of New Jersey No Drawing. Application February 16, 1950, Serial No. 144,592

2 Claims. (Cl. 260—667)

This invention relates to the new chemical compound, 1,1 - diphenyl - 2,2 - dimethylpropane, and to the process of preparing the same. Our novel chemical compound, 1,1-diphenyl-2,2-dimethylpropane, is useful in preparing compounds possessing insecticidal activity and is also useful in the preparation of other neo-pentane derivatives.

Regarded in certain of its broader aspects, our novel process involves reacting 1,1-diphenyl-2,2-dimethyl-propanol-1 with hydrogen in the presence of a copper chromite catalyst, and recovering the 1,1-diphenyl-2,2-dimethyl-propane thus formed.

In carrying out our novel chemical process, we utilize as starting material an alkyl ester of pivalic acid such as ethyl pivalate, represented by the formula:

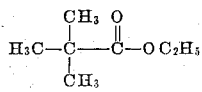

and phenyl magnesium bromide, prepared in the conventional manner for preparing a Grignard reagent. These compounds are reacted in an ether medium, after which the reaction product is hydrolyzed to yield 1,1-diphenyl-2,2-dimethyl-propanol-1 which may be identified by the following structural formula:

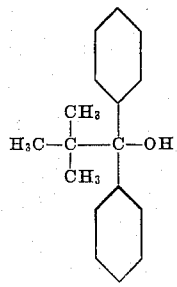

The 1,1-diphenyl-2,2-dimethyl-propanol-1 thus prepared may then be hydrogenated in the presence of a copper chromite catalyst to produce the corresponding 1,1 - diphenyl-2,2-dimethyl - propane having the formula:

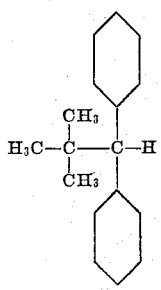

That this hydrogenation could be carried out successfully was entirely unexpected, in view of the highly hindered character of the molecule and the known tendency of neopentyl alcohols to dehydrate and rearrange, particularly at elevated temperatures.

In carrying out this new hydrogenation process, it is preferred to react the propanol with hydrogen at a temperature of about 175–275° C., at a pressure in excess of about 200 atmospheres, in the presence of about 5% by weight of copper chromite catalyst, and until 1 molar equivalent of hydrogen has been consumed. A total reaction period of about 3 hours is usually ample. The alcohol is preferably, though not necessarily, dissolved in a suitable solvent, such as a lower aliphatic alcohol. We further prefer the temperature range 200–250° C. At temperatures below about 175° C., the reaction progresses too slowly to be practicable. Above about 275° C., dehydration and rearrangement may occur.

The catalyst employed is prepared as described on page 13 of Adkins, "Reactions of Hydrogen with Organic Compounds over Copper-Chromium Oxide and Nickel Catalyst," the University of Wisconsin Press (1937). At the end of the reaction period, the catalyst is separated from the reaction mixture, the solvent is removed by evaporation, and the residue is purified, if desired, by recrystallization from a suitable solvent.

The 1,1-diphenyl-2,2-dimethyl-propane prepared in the above manner may be reacted with chlorine or bromine under conditions favoring ring substitution. This results in a halogenated 1,1-diphenyl-2,2-dimethyl-propane which has been found to possess marked and effective insecticidal activity. These compounds and the process for preparing the same are fully disclosed and claimed in our co-pending application, Serial No. 144,593, filed February 16, 1950.

The preparation of our novel chemical compound may be illustrated by the following specific example. It should be noted, of course, that this example is intended to be illustrative of the methods and procedures utilized in preparing this compound, and that it is not intended to be restrictive or to be regarded as embodying the only way in which our novel compound can be formed and recovered.

Example

In a three-necked flask fitted with separatory funnel, reflux condenser, and stirrer was placed magnesium turnings. Bromobenzene in dry ether was run in, and the flask was warmed until the reaction became rapid. Additional bromobenzene in ether was run in, with agitation, at a rate sufficient to cause vigorous refluxing.

When the addition of bromobenzene was complete, the reaction mixture was stirred.

The flask was then cooled by immersion in an ice bath, and ethyl pivalate was added. The solution was agitated for three hours and was then allowed to stand for about fifteen hours at room temperature. The reaction flask was again cooled by immersion in an ice bath, and an aqueous ammonium chloride solution was added. The ether layer was separated, dried over anhydrous sodium sulfate, and distilled under reduced pressure to give 1,1-diphenyl-2,2-dimethylpropanol-1, having a boiling point of 155–161° C./4 mm.

24 grams of 1,1-diphenyl-2,2-dimethyl-propanol-1 was dissolved in ethanol and placed in a bomb, and 10 grams of barium-stabilized copper chromite catalyst was added. The mixture was treated with hydrogen at 6000 p. s. i. and 250° C., for three hours, the bomb was cooled, and the catalyst was removed by filtration. The solvent was removed from the filtrate by concentrating to dryness. After cooling, 12.5 grams of solid was secured on filtration.

The solid was recrystallized several times from ethanol to give 1,1-diphenyl-2,2-dimethyl-propane having a melting point of 55–56° C.

Analysis calculated for $C_{17}H_{20}$: C, 91.01; H, 8.99; found: C, 91.27; H, 8.86.

We claim:

1. The process that comprises reacting 1,1-diphenyl-2,2-dimethyl-propanol-1 with hydrogen in the presence of a copper chromite catalyst, and recovering the 1,1-diphenyl-2,2-dimethyl-propane thus formed.

2. The process that comprises reacting 1,1-diphenyl-2,2-dimethyl propanol-1 with hydrogen in the presence of a copper chromite catalyst at a temperature range of about 175–275° C. and a pressure in excess of about 200 atmospheres to form 1,1-diphenyl-2,2-dimethyl propane.

EDWARD F. ROGERS.
HORACE D. BROWN.

References Cited in the file of this patent

UNITED STATES PATENTS

| Number | Name | Date |
|---|---|---|
| 2,106,735 | Gwynn | Feb. 1, 1938 |
| 2,114,717 | Lazier | Apr. 19, 1938 |

OTHER REFERENCES

Sabatier et al., Compt. rend. 156, 1430–4. Abstracted in Chemical Abstracts 7:3110 (1913).